US008817598B2

(12) United States Patent
Vavilala et al.

(10) Patent No.: US 8,817,598 B2
(45) Date of Patent: Aug. 26, 2014

(54) HARDWARE BASED CONVERGENCE FOR A RING NETWORK

(75) Inventors: Krishna Kumar Vavilala, Cedar Park, TX (US); Stephen Patrick Kolecki, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 310 days.

(21) Appl. No.: 13/450,959

(22) Filed: Apr. 19, 2012

(65) Prior Publication Data

US 2013/0279322 A1 Oct. 24, 2013

(51) Int. Cl.
*H04J 1/16* (2006.01)

(52) U.S. Cl.
USPC .......................................... 370/223; 370/222

(58) Field of Classification Search
USPC ......... 370/223, 222, 229, 216, 217, 224, 242, 370/243, 244, 245, 230, 235, 236, 237, 252, 370/404, 403, 405, 406
See application file for complete search history.

(56) References Cited

U.S. PATENT DOCUMENTS

| | | | | |
|---|---|---|---|---|
| 7,274,656 | B2 * | 9/2007 | Lee et al. | 370/223 |
| 7,688,716 | B2 * | 3/2010 | Pande et al. | 370/222 |
| 7,848,340 | B2 * | 12/2010 | Sakauchi et al. | 370/406 |
| 2002/0009092 | A1 * | 1/2002 | Seaman et al. | 370/406 |
| 2008/0101219 | A1 * | 5/2008 | Rose et al. | 370/224 |
| 2010/0226260 | A1 * | 9/2010 | Zinjuvadia et al. | 370/248 |
| 2013/0039170 | A1 * | 2/2013 | Higgins | 370/228 |

OTHER PUBLICATIONS

Huynh et al. "RRR: Rapid Ring Recovery, Sub-millisecond Decentralized Recovery for Ethernet Ring", Nov. 2011.
Cisco: "Cisco Resilient Ethernet Protocol" 2007.
Cisco: "Cisco Catalyst 2960-S FlexStack: Description, Usage, and Best Practices" 2012.

* cited by examiner

*Primary Examiner* — Abdullah Riyami
(74) *Attorney, Agent, or Firm* — Tucker Ellis LLP

(57) ABSTRACT

In accordance with an example embodiment, there is disclosed herein, an apparatus having first and second interfaces for communicating on a ring network. Upon receipt of a first signal on the first interface indicating a break in the ring, the apparatus stops forwarding packets onto the ring. Upon receipt of a second signal on the second port indicating a break in the ring, the apparatus forwards all packets destined for the ring network onto the ring network via both the first and second interfaces.

20 Claims, 4 Drawing Sheets

500

NORMAL OPERATING MODE — 502
RECEIVE FIRST BROKEN RING INDICATION ON FIRST PORT — 504
DISABLE FORWARDING — 506
SEND BROKEN RING INDICATION TO FC — 508
SEND BROKEN RING INDICATION ON SECOND PORT — 510
RECEIVE SECOND BROKEN RING INDICATION ON SECOND PORT — 512
PROPAGATE SECOND BROKEN RING INDICATION ON FIRST PORT — 514
BEGIN FLOODING — 516
OBTAIN NEW FORWARDING/DROP TABLES — 518
RETURN TO NORMAL OPERATING MODE — 520

HARDWARE BASED CONVERGENCE FOR A RING NETWORK

TECHNICAL FIELD

The present disclosure relates generally to hardware based convergence for rings such as stack rings.

BACKGROUND

In a ring network, the working topology must not have any loops to prevent a broadcast storm caused by flooding unknown Media Access Control (MAC) addresses and infinite looping. Therefore, for example in an Ethernet ring, one link does not forward data. When a link fails, there is a need to converge as soon as possible to minimize disruption. Because the ring topology has changed, new routes for forwarding data in the new topology are determined and nodes in the ring update their forwarding and/or drop tables accordingly.

BRIEF DESCRIPTION OF THE DRAWINGS

The accompanying drawings incorporated herein and forming a part of the specification illustrate the example embodiments.

DESCRIPTION OF EXAMPLE EMBODIMENTS

Figure 1:
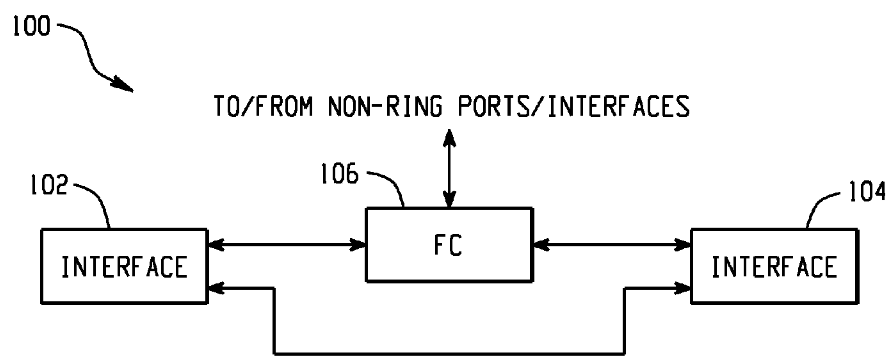
FIG. 1 is a block diagram of an example of an apparatus that employs hardware based convergence for a ring network.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, an apparatus having first and second interfaces for communicating on a ring network. Upon receipt of a first signal on the first interface indicating a break in the ring, the apparatus stops forwarding packets onto the ring. Upon receipt of a second signal on the second port indicating a break in the ring, the apparatus forwards all packets destined for the ring network onto the ring network via both the first and second interfaces.

Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Described in an example embodiment herein is a method that employs hardware based (e.g., an application specific integrated circuit "ASIC" and/or dedicated circuits) convergence implemented by nodes on a ring, such as a stack ring, to recover from a link failure. The method uses a predefined signal, referred to herein as a broken ring indication, such as, for example, a predefined Physical Coding Sublayer (PCS) code, such as 0x9c000003 or a predefined control frame, that is propagated throughout the ring. For example, in response to receiving a broken ring indication signal, at a first interface, a node on a ring propagates the broken ring indication signal via a second interface coupled with the ring and stops forwarding packets onto the ring. In response to receiving a second broken ring indication signal on the second interface, the node begins forwarding packets onto the ring; however, packets are (flooded) forwarded onto the ring via both the first and second interfaces. Packets are flooded onto the ring network until the network converges, e.g., drop and/or forwarding tables are updated to reflect the new ring configuration. Once the drop and/or forwarding tables are updated, flooding of the packets stops and the updated drop and/or forwarding tables are employed.

Restoring of the link is treated as another convergence event. For example, when the link is restored (or the ring "heals"), the drop and/or forwarding tables are updated with the restored configuration. A healed (or restored) ring indication signal, such as, for example, a predefined PCS code, such as 0x9c00004 or a predefined control frame, is propagated throughout the ring, starting from the edges of the previously failed link. A node on the ring in response to receiving a healed ring indication on a first interface coupled with the ring, propagates the signal on the ring via a second interface and stops forwarding packets onto the ring. In response to receiving a second restored link indication on a second interface coupled with the ring, the node waits a predefined amount of time and then resumes forwarding packets employing the drop and/or forwarding tables updated with the restored configuration.

FIG. 1 is a block diagram of an example of an apparatus 100 that employs hardware based convergence for a ring network. The apparatus 100 comprises a first interface 102, a second interface 104 and a forwarding controller (FC) 106.

The first interface 102 and second interface 104 are suitable for coupling with a ring network (not shown, see e.g., FIGS. 3 and 4 for examples of ring networks) allowing the apparatus 100 to send and receive data with external devices coupled with the ring network. As those skilled in the art can readily appreciate, the interfaces 102, 104 may suitably comprise an Application Specific Integrated Circuit (ASIC), combinational logic, and/or other dedicated circuits for performing the functionality described herein.

The forwarding controller 106 is employed for routing packets between the first interface 102, the second interface 104 and/or non-ring ports/interfaces. For example, a packet that is received from a non-ring destined for the ring network is routed by the forwarding controller 106 to the appropriate interface, for example the interface 102 and/or interface 104.

In an example embodiment, a first broken ring indication signal indicating a broken link in the ring network is received at the first interface 102. The first interface 102 propagates the first broken ring indication signal to the second interface 104 and the forwarding controller 106. The second interface 104 propagates the first broken ring indication signal onto the ring network. The first interface 102, the second interface 104, and the forwarding controller 106 stop forwarding packets into the ring network in response to the first broken ring indication signal.

A second broken ring indication signal is received at the second interface 104. The second interface 104 propagates the second broken ring indication signal to the first interface 102 and the forwarding controller 106. Packets are forwarded onto the ring network responsive to receiving both the first broken ring indication signal and the second broken ring indication signal. However, the forwarding controller 106 replicates packets destined to the ring network, thus, packets in the ring network are forwarded onto the ring network by both the first interface 102 and the second interface 104. This mode of operation is referred to herein as "broken-ring" mode.

In an example embodiment, the forwarding controller 106 employs a replication mask. Thus, while in broken-ring mode, any packets destined for the ring network will be replicated in accordance with the replication mask. For example, any packet destined for the first interface 102 will be replicated and also forwarded onto the ring network by the second interface 104. Likewise, any packet destined for the second interface 104 will be replicated and also forwarded onto the ring network by the first interface 102.

In an example embodiment, the forwarding controller 106 and the interfaces 102, 104 wait for a predetermined time period after both the first and second broken ring indications signals are received before forwarding packets onto the ring network. For example, a timer may be initialized after both the first and second broken ring indications signals are received, and forwarding of packets resumes after the expiration of the timer.

Any suitable type of signal may be employed for communicating the first and second broken ring indication signals. For example, a predefined Physical Coding Sublayer (PCS) code, such as 0x9c000003, can be employed. In an example embodiment, a predefined control frame is employed for the first and second broken ring indication signals.

In an example embodiment, the first broken ring indication signal is based on detecting a link coupling the first interface 102 with another node in the ring network. For example, if the apparatus 100 is at the edge of the broken link, then detecting the broken link will be treated the same as the first broken ring indication signal, which would be propagated by the second interface 104 and forwarding of packets on the ring network via the interfaces 102, 104 will stop. Packets will not be forwarded onto the ring network until a second broken ring indication signal is received on both the first interface 102 and the second interface 104.

Figure 2:
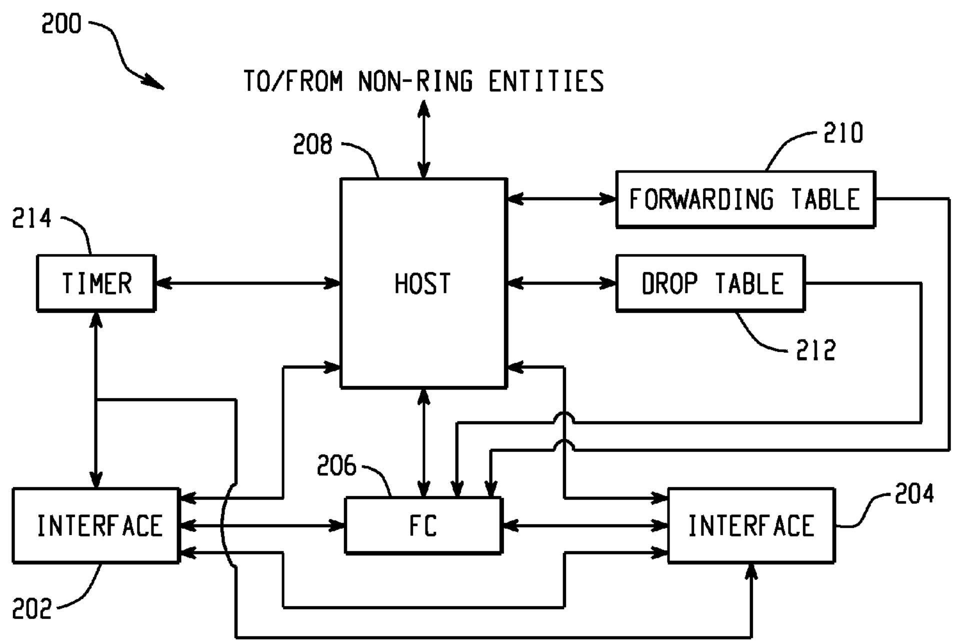
FIG. 2 is a block diagram of an example of an apparatus that employs hardware based convergence for a ring network with a processor that employs a forwarding table and a lookup table.

FIG. 2 is a block diagram of an example of an apparatus 200 that employs hardware based convergence for a ring network with a processor that employs a forwarding table and a lookup table. The apparatus 200 comprises a first interface 202, a second interface 204, a forwarding controller (FC) 206, a host processor 208, a forwarding table 210, and a drop table 212. Optionally, the apparatus 200 may further comprise a timer 214.

The first interface 202 and the second interface 204 are suitable for coupling with a ring network (not shown, see e.g., FIGS. 3 and 4 for examples of ring networks) allowing the apparatus 200 to send and receive data with external devices coupled with the ring network. As those skilled in the art can readily appreciate, the interfaces 202, 204 may suitably comprise an Application Specific Integrated Circuit (ASIC), combinational logic, and/or other dedicated circuits for performing the functionality described herein.

The forwarding controller 206 is employed for routing packets between the first interface 202, the second interface 204 and/or non-ring ports/interfaces. For example, a packet that is received from a non-ring destined for the ring network is routed by the forwarding controller 206 to the appropriate interface, for example the interface 202 and/or interface 204.

In an example embodiment, a first broken ring indication signal indicating a broken link in the ring network is received at the first interface 202. The first interface 202 propagates the first broken ring indication signal to the second interface 204 and the forwarding controller 206. The second interface 202 propagates the first broken ring indication signal onto the ring network. The first interface 202, second interface 204, and the forwarding controller 206 stop forwarding packets onto the ring network in response to the first broken ring indication signal.

A second broken ring indication signal is received at the second interface 204. The second interface 204 propagates the second broken ring indication signal to the first interface 202 and the forwarding controller 206. Packets are forwarded onto the ring network responsive to receiving both the first broken ring indication signal and the second broken ring indication signal. However, the forwarding controller 206 replicates packets destined to the ring network, thus, packets to the ring network are forwarded onto the ring network by both the first interface 202 and the second interface 204. This mode of operation is referred to herein as "broken-ring" mode.

In an example embodiment, the forwarding controller 206 employs a replication mask. Thus, while in broken-ring mode, any packets destined for the ring network will be replicated in accordance with the replication mask. For example, any packet destined for the first interface 202 will be replicated and also forwarded onto the ring network by the second interface 204. Likewise, any packet destined for the second interface 204 will be replicated and also forwarded onto the ring network by The first interface 202. In particular embodiments, the forwarding controller 206 also employs a broken ring drop table that allows for flooding of packets onto the ring network. For example, a node that was on the edge of the ring network would be configured not to forward packets across the edge link. In broken ring mode, the broken ring mode drop table would enable forwarding across the edge link. In an alternate example embodiment, the forwarding controller 206 ignores the drop table while in broken ring mode and forwards all packets onto the ring network.

In an example embodiment, the forwarding controller 206 and the interfaces 202, 204 wait for a predetermined time period after both the first and second broken ring indications signals are received before forwarding packets onto the ring network. For example, the timer 214 may be initialized after both the first and second broken ring indications signals are received, and forwarding of packets resumes after the expiration of the timer.

Any suitable type of signal may be employed for communicating the first and second broken ring indication signals. For example, a predefined Physical Coding Sublayer (PCS) code, such as 0x9c000003, can be employed. In an example embodiment, a predefined control frame is employed for the first and second broken ring indication signals.

In an example embodiment, the first broken ring indication signal is based on detecting a link coupling the first interface 202 with another node in the ring network. For example, if the apparatus 200 is at the edge of the broken link, then detecting the broken link will be treated the same as the first broken ring indication signal, which would be propagated by the second interface 204 and forwarding of packets on the ring network via the interfaces 202, 204 will stop. Packets will not be forwarded onto the ring network until a second broken ring indication signal is received on both the first interface 202 and the second interface 204.

The host processor 208 receives the first and/or second broken ring indication signals from either one or both of the interfaces 202, 204. Because the broken link may eventually be restored (or "healed"), flooding of packets onto the ring network will result in looping (or "déjà vu") once the broken link is restored. Therefore, the host processor 208 obtains updated forwarding table data and drop table data for the forwarding table 210 and the drop table 212 respectively to converge with the network topology after the link failure. In an example embodiment, the host processor 208 obtains the updated forwarding table data and drop table data by communicating with the other nodes on the ring network via the interfaces 202, 204. For example, the host processor 208 may poll other nodes on the ring network. In another example embodiment, the host processor obtains the updated forwarding table data and updated drop table data from another node (for example, from a "master" node on the ring network).

The host processor 208 reprograms the forwarding table 210 and the drop table 212 with the updated forwarding table data and updated drop table data respectively. The host processor 208 signals the forwarding controller 206 to switch from the broken ring state to the normal state where the forwarding controller forwards packets onto the ring network based on the data stored in the forwarding table 210 and the drop table 212. For example, if the first interface 202 is at the edge of the broken link, the drop table 212 will contain an entry instructing the forwarding controller 206 and/or the first interface 202 not to forward packets via the first interface 202.

In an example embodiment, the host processor 208 obtains a second updated forwarding table and a second updated drop table in response to the broken link in the ring network being restored (or "healed"). A first healed ring indication signal is received via the first interface 202, and in response to receiving the first healed ring indication signal the first interface 202 communicates the first healed ring indication signal to the forwarding controller 206 and the second interface 204. Forwarding onto the ring network stops in response to the first healed ring indication signal. In an example embodiment, the drop table 212 is updated with the second updated data once forwarding onto the ring network stops. In particular embodiments, the forwarding table 210 is also updated once forwarding onto the ring network stops. The second interface 204 forwards the first healed ring indication signal onto the ring network. A second healed ring indication signal indicating that the broken link in the ring network has been restored is received via the second interface 204. In response to receiving the second broken link healed ring indication signal, the second interface 204 communicates the second healed ring indication signal to the first interface 202 and the forwarding controller 206. Forwarding packets onto the ring network resumes in response to receiving both the first broken ring indication signal and the second broken ring indication signal in accordance with the updated drop table data.

In an example embodiment, the timer 214 is initialized upon receipt of both the first and second healed ring indication signals. Forwarding packets onto the ring network begins after the timer 214 expires.

In an example embodiment, the broken link is coupled with the first interface 202. In this situation, the host processor 208 would initiate sending of the first healed ring indication. The host processor 208 may imitate sending of the first healed indication in response to a signal received from another node (e.g., a master node for the ring network).

Figure 3:
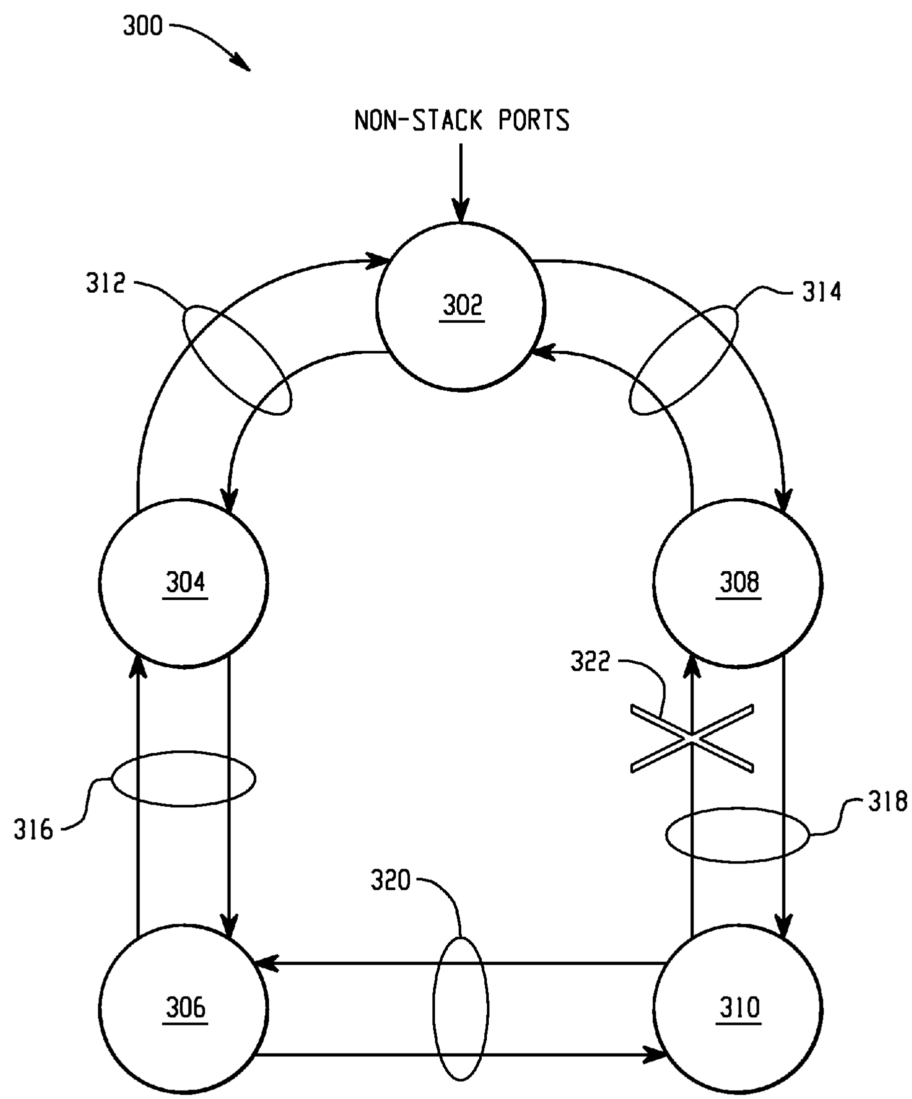
FIG. 3 is a block diagram of a ring network comprising nodes configured in accordance with an example embodiment illustrating a unidirectional link failure between two nodes configured in accordance with an example embodiment.

FIG. 3 is a block diagram of a ring network 300 comprising nodes configured in accordance with an example embodiment illustrating a unidirectional link failure between two nodes configured in accordance with an example embodiment. The configuration illustrated in the ring network 300 is suitable for implementing a stacked switch environment. In a stacked switch environment, switches are employed to couple devices to the ring network 300 and the ports/interfaces coupled to the ring network 300 are referred to as "stack ports." In the illustrated example, each node has two stack bidirectional ports/interfaces.

In the illustrated example, the node 302 is coupled with the node 304 via the link 312. The link 304 is coupled with the node 306 via the link 316. The node 302 is also coupled with the node 308 via the link 314. The node 308 is coupled with the node 310 via the link 318. To prevent looping (or "déjà vu"), in normal operation the link 320 coupling the nodes 306 and 310 is inactive. The drop tables of the links 306 and 310 are configured to prevent frames from being forwarded onto the link 320.

Packets received from non-ring (or stack) ports by the node 302 can be routed to one or both of the links 312 and 314. For example, multicast and broadcast packets can be routed onto both the links 312 and 314 to the nodes 304 and 308 respectively, which will forward the packets to the nodes 306 and 310 via the links 316 and 318 respectively. Because, the drop tables of the nodes 306 and 310 prevent forwarding of packets onto the link 320, the multicast and/or broadcast packets are dropped at the nodes 306 and 310. If a unicast packet is received from a non-stack port by the node 302 for routing onto the ring network, the node 302 determines from its forwarding table whether to route the packet onto the link 312 or the link 314.

In the illustrated example, a unidirectional link break 322 is detected on the link 318 by the node 308. In response to the link break 322, the node 308 stops forwarding packets onto the ring network. The node 308 sends a first broken link indication signal to the node 302 via the link 314 and sends a second broken link indication signal via the link 318 to the node 310 (because the break is unidirectional, the node 308 can still communicate with the node 310).

The first broken link indication signal is propagated in a first direction around the ring, e.g., the node 302 to 304, 304 to 306, 306 to 310, and 310 to 308. The second broken link indication signal is propagated in a second direction around the ring, e.g., the node 310 to 306, 306 to 304, 304 to 302, and 302 to 308. Whenever one of the nodes 302, 304, 306, and 310 receives one of the first broken ring indication signal or the second ring indication signal, whichever arrives first, they stop forwarding packets onto the ring network and propagate the signal to the next node. The nodes 306 and 310 also forward the first and second broken link indication signals onto the link 320. The nodes 306 and 310 may employ a broken ring drop table which would allow signals across the link 320 or they may be configured to ignore the drop table while in broken ring mode.

Except for nodes at the edge of the link break 322 (the nodes 308 and 310 in the illustrated example), after the nodes 302, 304, and 306, have received both the first broken ring indication signal and the second broken ring indication signal, the nodes 302, 304, and 306 begin forwarding packets onto the network by flooding packets from non-ring (or stack) ports via both interfaces onto the ring network. For example, unicast packets received from non-stack ports by the node 302 are routed onto both the links 312 and 314. Because of the link failure at the link 318, packets will not loop on the ring network. Packets received from a first ring interface destined to a second ring interface are forwarded to the second ring interface as before the link failure.

Note that the node 308 at the edge of the link failure cannot receive the first broken ring indication from the link 310 because of the link break 322 on the link 318. The node 308 will update its drop table to prevent packets being forwarded onto the link 318 in response to detecting the break. Upon receiving the second broken link indication signal, the node 308 will begin routing packets onto the link 314 of the ring network.

The node 310 is at the opposite end of the link 318. However, because the link break 322 is a unidirectional break, the node 310 waits until receiving both the first broken link indication signal and the second broken link indication signal before forwarding packets onto the ring network. While in broken link mode, the link 310 will attempt to forward packets onto both the links 318 and 320, however, because of the link break 322, packets routed on the link 318 will not be propagated on the ring network.

Because the break in the link 318 may eventually be restored ("healed"), the drop and forwarding tables of the nodes 302, 304, 306, 308, and 310 should be updated to prevent looping after the link is restored. In an example embodiment, one link in the ring network will function as a "master" node and determine the appropriate forwarding and drop tables for each node in the network. In another example embodiment, each node may independently calculate its own forwarding and routing tables. The communications for updating the forwarding and drop tables can occur between host processors controlling the operation of the nodes 302, 304, 306, 308, and 310, which may be referred to as "software" updates. After the software updates the ("hardware") forwarding and drop tables, the host processor informs the forwarding controller to exit broken ring mode and the nodes resume forwarding of packets in accordance with their drop and forwarding tables.

Upon determining that the link break 322 on the link 318 has been restored (or "healed"), a new (second) forward table data and drop table data are calculated and/or distributed to the nodes 302, 304, 306, 308, and 310. Link healed messages are sent from the nodes 308, 310 at the edges of the now restored the link 318 in different directions around the ring network. For example, the node 308 sends a first healed (restored) link indication signal on the link 314 to the node 302 that is propagated to the nodes 304, 306, and 310 respectively. The node 310 sends a second link healed indication signal on the link 320 to the link 306 that is propagated to the nodes 304, 302, and 308 respectively.

Upon receipt of one of the first or second healed link indications signals, whichever arrives first, a node will stop forwarding packets onto the ring network. The forwarding table and drop table of the nodes 302, 304, 306, 308, and 310 are reprogrammed with the new (second) forwarding table data and drop table data respectively. After receipt of both the first healed ring indication signal and second healed ring indication signal, the nodes 302, 304, 306, 308, and 310 will resume forwarding of packets onto the ring network. In particular embodiments, resumption of forwarding packets onto the ring network is delayed for a predefined time period after receiving both the first and second healed ring indication signals. When forwarding resumes, the packets will be forwarded in accordance with the second forwarding table data and drop table data. For example, once the link 318 has been restored, forwarding resumes on the link 318 and forwarding on the link 320 is blocked to prevent looping. Thus, for example, before the link 318 was healed, the node 302 would forward packets via the links 312, 316, and 320 to the node 310, and after the link is healed node 302 would forward packets to the node 310 via the links 314 and 318.

Figure 4:
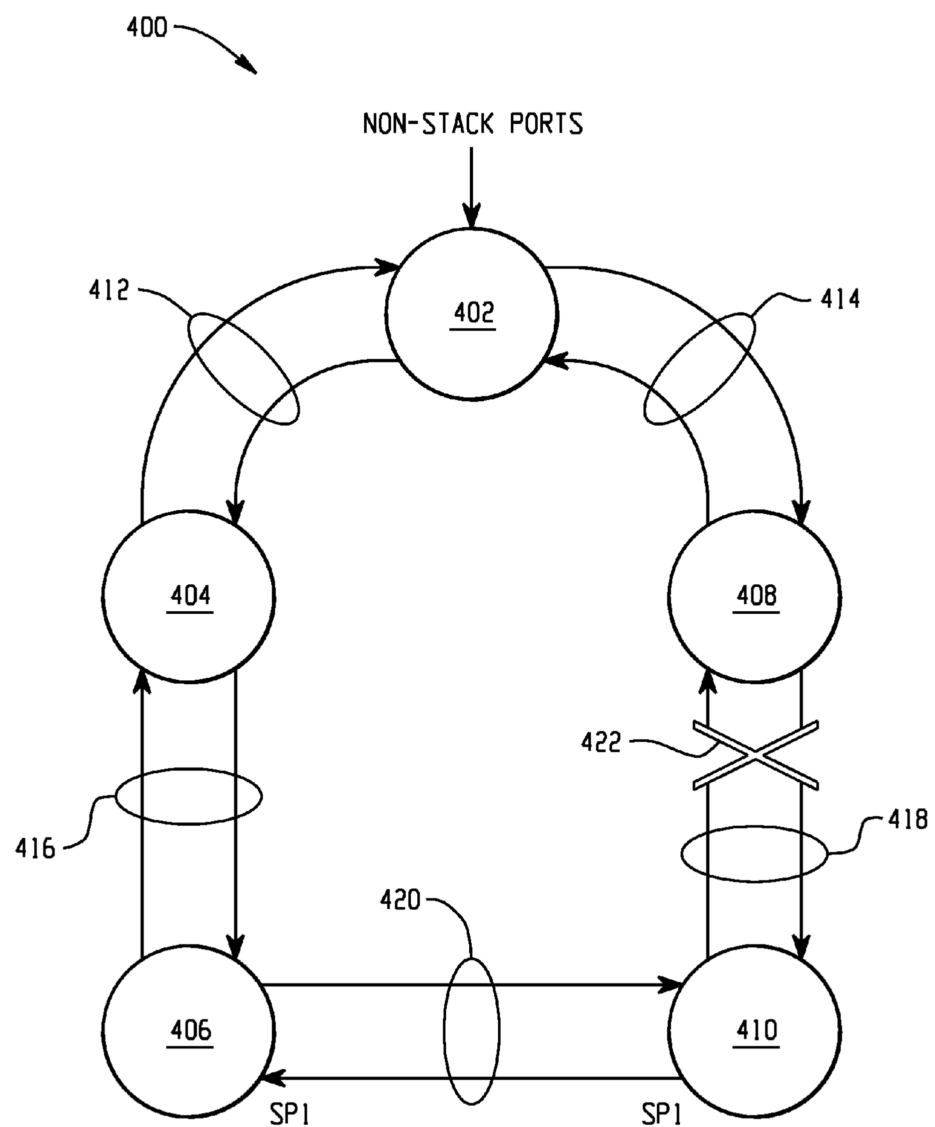
FIG. 4 is a block diagram of a ring network comprising nodes configured in accordance with an example embodiment illustrating a unidirectional link failure between two nodes configured in accordance with an example embodiment.

FIG. 4 is a block diagram of a ring network 400 comprising nodes configured in accordance with an example embodiment illustrating a bidirectional link failure 422 between two the nodes 408, 410 configured in accordance with an example embodiment. The configuration illustrated in the ring network 400 is suitable for implementing a stacked switch environment. In a stacked switch environment, switches are employed to couple devices to the ring network and the ports/interfaces coupled to the ring network are referred to as "stack ports." In the illustrated example, each node has two stack bidirectional ports/interfaces.

In the illustrated example, the node 402 is coupled with the node 404 via the link 412. The node 404 is coupled with the node 406 via the link 416. The node 402 is also coupled with the node 408 via the link 414. The node 408 is coupled with the node 410 via the link 418. To prevent looping (or "déjà vu"), in normal operation link 420 coupling the nodes 406 and 410 is inactive. The drop tables of the links 406 and 410 are configured to prevent frames from being forwarded onto the link 420.

Packets received from non-ring (or stack) ports by the node 402 can be routed to one or both of the links 412 and 414. For example, multicast and broadcast packets can be routed onto both the links 412 and 414 to the nodes 404 and 408 respectively, which will forward the packets to the nodes 406 and 410 via the links 416 and 418 respectively. Because, the drop tables of the nodes 406 and 410 prevent forwarding of packets onto the link 420, the multicast and/or broadcast packets are dropped at the nodes 406 and 410. If a unicast packet is received from a non-stack port by the node 402 for routing onto the ring network, the node 402 determines from its forwarding table whether to route the packet onto the link 412 or link 414.

In the illustrated example, a bidirectional link break 422 is detected on the link 418 by the nodes 408 and 410. In response to the link break 422, the nodes 408 and 410 stop forwarding packets onto the ring network. The node 408 sends a first broken link indication signal to the node 402 via the link 414 and the node 410 sends a second broken link indication signal via the link 420 to the node 406.

The first broken link indication signal is propagated in a first direction around the ring, e.g., the node 402 to 404, 404 to 406, and 406 to 410. The second broken link indication signal is propagated in a second direction around the ring, e.g., the node 410 to 406, 406 to 404, 404 to 402, and 402 to 408. Whenever one of the nodes 402, 404, and 406 receives one of the first broken ring indication signal or the second ring indication signal, whichever arrives first, they stop forwarding packets onto the ring network and propagate the signal to the next node. The nodes 406 and 410 also forward the first and second broken link indication signals onto the link 420. The nodes 406 and 410 may employ a broken ring drop table which would allow signals to across the link 420 or they may be configured to ignore the drop table while in broken ring mode.

Except for nodes at the edge of the link break 422 (the nodes 408 and 410 in the illustrated example), after the nodes 402, 404, and 406, have received both the first broken ring indication signal and the second broken ring indication signal, the nodes 402, 404, and 406 begin forwarding packets onto the network by flooding packets from non-ring (or stack) ports via both interfaces onto the ring network. For example, unicast packets received from non-stack ports by the node 402 are routed onto both the links 412 and 414. Because of the link failure at link 418, packets will not loop on the ring network. Packets received from a first ring interface destined to a second ring interface are forwarded to the second ring interface as before the link failure.

The nodes 408 and 410 will update its drop tables to prevent packets being forwarded onto the link 418 in response to detecting the break. Upon receiving the first broken link indication signal, the node 410 will begin routing packets onto the ring network via the link 420. Upon receiving the second broken link indication signal, the node 408 will begin routing packets onto the link 414 of the ring network.

Because the break in the link 418 may eventually be restored ("healed"), the drop and forwarding tables of the nodes 402, 404, 406, 408, and 410 should be updated to prevent looping after the link is restored. In an example embodiment, one link in the ring network will function as a "master" node and determine the appropriate forwarding and drop tables for each node in the network. In another example embodiment, each node may independently calculate its own forwarding and routing tables. The communications for updating the forwarding and drop tables can occur between host processors controlling the operation of the nodes 402, 404, 406, 408, and 410, which may be referred to as "software" updates. After the software updates the ("hardware") forwarding and drop tables, the host processor informs the forwarding controller to exit broken ring mode and the nodes resume forwarding of packets in accordance with their drop and forwarding tables.

Upon determining that the link break 422 on the link 418 has been restored (or "healed"), a new (second) forward table data and drop table data are calculated and/or distributed to the nodes 402, 404, 406, 408, and 410. Link healed messages are sent from the nodes 408, 410 at the edges of the now restored link 418 in different directions around the ring network. For example, the node 408 sends a first healed (restored) link indication signal on the link 414 to node 402 that is propagated to the nodes 404, 406, and 410 respectively. The node 410 sends a second link healed indication signal on the link 420 to the node 406 that is propagated to the nodes 404, 402, and 408 respectively.

Upon receipt of one of the first or second healed link indications signals, whichever arrives first, a node will stop forwarding packets onto the ring network. The forwarding table and drop table of the nodes 402, 404, 406, 408, and 410 are reprogrammed with the new (second) forwarding table data and drop table data respectively. After receipt of both the first healed ring indication signal and second healed ring indication signal, nodes the 402, 404, 406, 408, and 410 will resume forwarding of packets onto the ring network. In particular embodiments, resumption of forwarding packets onto the ring network is delayed for a predefined time period after receiving both the first and second healed ring indication signals. When forwarding resumes, the packets will be forwarded in accordance with the second forwarding table data and drop table data. For example, once the link 418 has been restored, forwarding resumes on the link 418 and forwarding on the link 420 is blocked to prevent looping. Thus, for example, before the link 418 was healed, the node 402 would forward packets via the links 412, 416, and 420 to the node 410, and after the link is healed the node 402 would forward packets to the node 410 via links 414 and 418.

Figure 5:
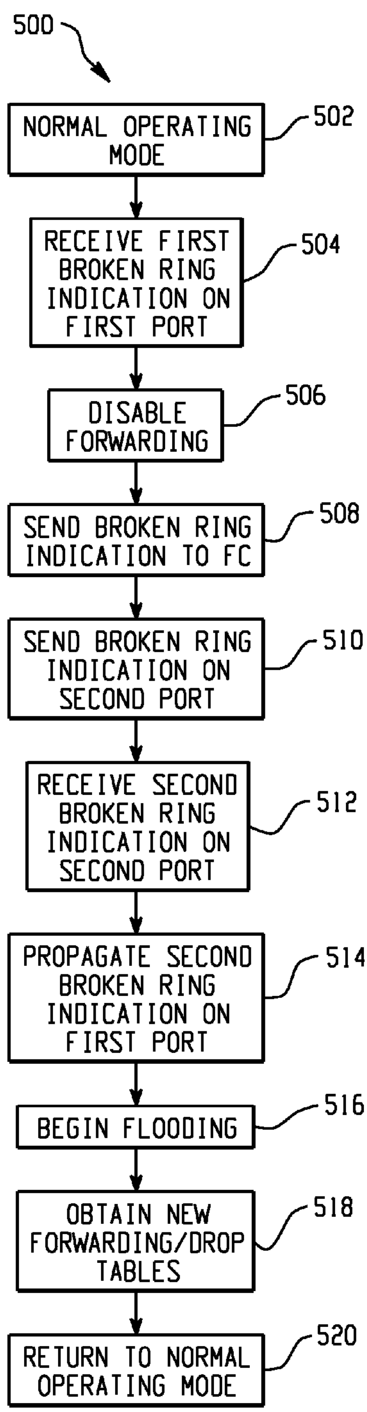
FIG. 5 illustrates a methodology performed by a node in a ring network in response to a link failure.
Figure 6:
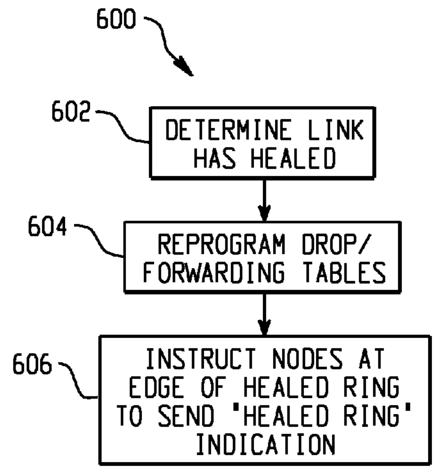
FIG. 6 illustrates a methodology performed by a master node in a ring network in response to determining a broken link has been restored.
Figure 7:
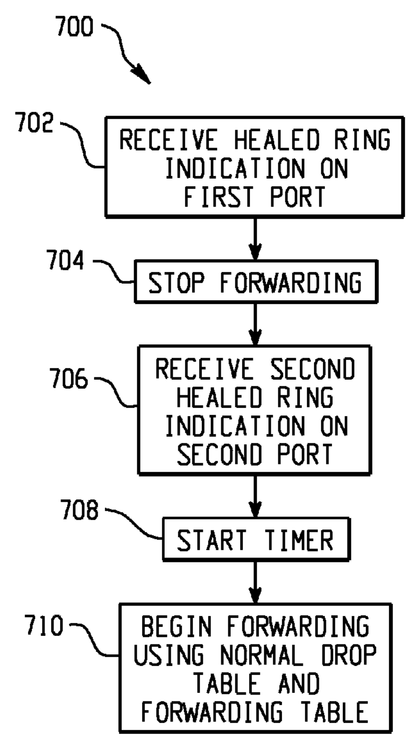
FIG. 7 illustrates a methodology performed by a node in a ring network in response to a broken link being restored.

In view of the foregoing structural and functional features described above, methodologies in accordance with example embodiments will be better appreciated with reference to FIGS. 5-7. While, for purposes of simplicity of explanation, the methodologies of FIGS. 5-7 are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required to implement the illustrated methodologies.

FIG. 5 illustrates a methodology 500 performed by a node in a ring network in response to a link failure. The methodology begins at 502 where the node is operating in a normal mode. In the normal mode, the node employs hardware forwarding tables for determining how to forward packets onto the ring network. Unicast packets are forwarded on one port while broadcast and multicast packets are forwarded on both ports.

At 504, a first broken ring indication signal is received on a first port/interface. In an example embodiment, the first broken ring indication signal is received via a hardware indication, for example by employing a predefined PCS code. In response to the first broken ring indication signal, forwarding of packets onto the ring network stops (or is disabled) as indicated by 506. The broken ring indication signal is propagated to a forwarding controller as indicated by 508. The first broken ring indication signal is propagated onto the ring network via a second interface as indicated by 510.

At 512, a second broken ring indication signal is received on a second interface/port. The second broken ring signal is propagated onto the ring network via the first interface port as indicated by 514.

Upon receiving both the first and second broken ring indications, packets are "flooded" (e.g., forwarded on both the first and second interfaces) onto the ring network, as indicated by 516. For example, unicast packets that in normal mode are forwarded onto the ring network via one interface are now forwarded onto the ring network via both interfaces.

At 518, the software (executed by the host processor) begins converging. In an example embodiment, the host processor receives the first and second broken link indication signals from either the first and second interfaces, or from the forwarding controller. Upon receiving one of the broken ring indication signals, the software begins to (converge) determine the network topology after the break. The software obtains (new) data for the forwarding table and drop table. The software then reprograms the (hardware) forwarding and drop table with the new data. Upon reprogramming the hardware tables, the software notifies the forwarding controller to return to normal mode and the forwarding controller employs the updated forwarding and drop tables for distributing traffic onto the ring network, as indicated by 520.

FIG. 6 illustrates a methodology 600 performed by a master node in a ring network in response to determining a broken link has been restored. In this example, the master node also distributes the drop and forwarding tables for other nodes on the rings; however, those skilled in the art should readily appreciate that in other example embodiments, the nodes themselves may update their drop and forwarding tables.

At 602, a determination is made that the link has been restored (healed). This information may be obtained from one or both of the nodes at the edge of the healed link.

At 604, the forwarding and drop tables are updated. Poll frames may be sent across the ring to determine nodes in the ring. A determination is made where to drop packets in order to prevent looping (or "déjà vu"). Note that the old drop and forwarding tables that were employed before the link was broken are not used since it is possible that a new node may have been added to the ring during the break. Therefore, the configuration of the network is determined and a decision on where to break the ring can be based on parameters such as load balancing, etc. In particular embodiments, drop and forwarding tables are calculated for nodes on the ring, and the drop and forwarding tables are distributed to nodes on the ring.

At 606, the nodes at the edge of the healed link are instructed to send a healed ring indication signal. When a node on the ring receives one of the healed ring indication signals, the node will stop forwarding packets and update their forwarding and drop tables. Upon receiving both of the healed ring indication signals, a node will begin forwarding packets in accordance with the updated drop and forwarding tables. In particular embodiments, a node may wait a predefined time period after receiving both healed ring indication signals before forwarding packets onto that ring network to allow the healed ring indication signals to traverse the ring.

FIG. 7 illustrates a methodology 700 performed by a node in a ring network in response to a broken link being restored. In this example embodiment, a pair of signals referred to as healed ring indication signals, are sent around the ring network. The node may have received updated drop table and forwarding table data to employ when the broken link has healed.

At 702, a first healed ring indication signal is received on a first port. Any suitable technique may be employed for receiving the first healed ring indication signal. In an example embodiment, the first healed ring indication may be a predefined PCS signal, such as for example 0x9c000004. In another example embodiment, the healed ring signal may be a predefined control frame.

At 704, forwarding onto the ring network stops. In particular embodiments, if updated drop table and forwarding table data to be employed once the ring has healed has not yet been stored into the drop table and forwarding table respectively, the drop table and forwarding table are updated with the updated drop table and forwarding table data.

At 706, a second healed ring indication signal is received on a second interface. In this example, the second healed ring indication signal is received either at the same time or after the first healed ring indication signal. Consequently, at 706, both the first and second healed ring node indication signals have been received.

Optionally, at 708, a timer is started in response to receiving both the first and second healed ring node indication signals. The timer is set for a predefined time period. In an example embodiment, the timer is set to allow the first and second healed ring indication node signals to traverse the ring network.

At 710, forwarding of packets onto the ring network resumes. Packets are forwarded in accordance with updated forwarding and drop table data for the healed network. If a node has not yet received updated data for the forwarding and drop tables for the healed ring network, packets may be flooded onto ring network until the forwarding and drop tables are updated, provided the nodes at the edge a selected link have updated their drop tables to prevent packets from being forwarded across the selected link to prevent looping.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:

a first interface for communicating with a ring network;

a second interface for communicating with the ring network;

a forwarding controller for selectively routing packets onto the ring network via the first interface, the second interface, or both the first and second interfaces;

wherein in response to receiving a first broken ring indication signal indicating a broken link in the ring network via the first interface, the first interface communicates the first broken ring indication signal to the forwarding controller and the second interface, and forwarding onto the ring network stops in response to the first broken ring indication signal;

wherein the second interface forwards the first broken ring indication signal onto the ring network;

wherein in response to receiving a second broken ring indication signal for the broken link in the ring network via the second interface, the second interface communicates the second broken ring indication signal to the first interface and the forwarding controller;

wherein forwarding of packets onto the ring network resumes responsive to receiving both the first broken ring indication signal and the second broken ring indication signal; and wherein the forwarding controller replicates packets for the ring network and forwards the packets onto the ring network via the first interface and the second interface in response to receiving both the first broken ring indication signal and the second broken ring indication signal.

2. The apparatus set forth in claim 1, further comprising:

a processor;

a drop table; and a forwarding table;

wherein the first interface communicates the first broken ring indication signal to the processor; and the processor in response to the first broken ring indication signal obtains updated drop table data for the drop table and updated forwarding table data for the forwarding table and updates the drop table with the updated drop table data and the forwarding table with the updated forwarding table data;

wherein the processor signals the forwarding controller to discontinue replicating and forwarding packets for routing onto the ring network on both the first interface and the second interface in response to updating the drop table and the forwarding table; and wherein packets are forwarded onto the ring network in accordance with the updated drop table data and updated forwarding data table after the forwarding controller discontinues replicating and forwarding packets on both the first interface and the second interface.

3. The apparatus set forth in claim 2, wherein the processor obtains the updated forwarding table and drop table by communicating with other nodes on the ring network and based on responses received from the other nodes determines the updated forwarding table data and the updated drop table data.

4. The apparatus set forth in claim 2, wherein the processor obtains the new forwarding table and drop table by receiving the updated forwarding table data and updated drop table data from another node on the ring network.

5. The apparatus set forth in claim 1, further comprising a timer coupled with the first interface, the second interface, and the forwarding controller;

wherein the timer is initiated upon receiving the second broken ring indication; and wherein forwarding packets onto the ring network begins after timer expires.

6. The apparatus set forth in claim 2, wherein a second updated drop data is received for the drop table in response to the broken link in the ring network being restored;

wherein a first healed ring indication signal is received via the first interface, and in response to receiving the first healed ring indication signal the first interface communicates the first healed ring indication signal to the forwarding controller and the second interface, and forwarding onto the ring network stops in response to the first healed ring indication signal;

wherein the drop table is updated with the second updated data once forwarding onto the ring network stops;

wherein the second interface forwards the first healed ring indication signal onto the ring network;

wherein in response to receiving a second healed ring indication signal indicating that the broken link in the ring network has been restored via the second interface, the second interface communicates the second healed ring indication signal to the first interface and the forwarding controller; and wherein forwarding packets onto the ring network resumes in response to receiving both the first healed ring indication signal and the second healed ring indication signal in accordance with the updated drop table data.

7. The apparatus set forth in claim 6, further comprising a timer coupled with the first interface, the second interface, and the forwarding controller;

wherein the timer is initiated upon receiving the second healed ring indication; and wherein forwarding packets onto the ring network begins after the timer expires.

8. The apparatus set forth in claim 1, wherein a first healed ring indication signal is received via the first interface, and in response to receiving the first healed ring indication signal the first interface communicates the first healed ring indication signal to the forwarding controller and the second interface, and forwarding onto the ring network stops in response to the first healed ring indication signal;

wherein the second interface forwards the first healed ring indication signal onto the ring network;

wherein in response to receiving a second healed ring indication signal at the second interface indicating that the broken link in the ring network has been restored, the second interface communicates the healed ring indication signal to the first interface and the forwarding controller; and wherein forwarding packets onto the ring network resumes in response to receiving both the first healed ring indication signal and the second healed ring indication signal in accordance.

9. The apparatus set forth in claim 8, further comprising a timer coupled with the first interface, the second interface, and the forwarding controller;

wherein the timer is initiated upon receiving the second healed ring indication; and wherein forwarding packets onto the ring network begins after time timer expires.

10. The apparatus set forth in claim 1, wherein the first broken ring signal employs a predefined Physical Coding Sublayer (PCS) code and the second broken ring indication signal employs the predefined PCS code.

11. The apparatus set forth in claim 1, wherein the first broken ring signal employs a predefined control frame and the second broken ring indication signal employs the predefined control frame.

12. The apparatus set forth in claim 1, wherein the first broken ring signal is received in response to detecting a broken link coupling the first interface with a neighboring node on the ring network.

13. The apparatus set forth in claim 12, further comprising:

a processor; and a drop table; and wherein the first interface communicates the first broken ring indication signal to the processor; and the processor in response to the first broken ring indication signal obtains updated drop table data for the drop table, the updated drop table data containing data indicating that packets should not be forwarded onto the first interface;

wherein the processor signals the forwarding controller to discontinue replicating and forwarding packets for routing onto the ring network on both the first interface and the second interface in response to updating the drop table; and wherein packets destined to the first interface are dropped once the drop table is updated.

14. A method, comprising:

receiving a first broken ring indication signal indicating a broken link in the ring network via a first interface;

communicating the first broken ring indication signal to a forwarding controller and a second interface;

halting forwarding of packets onto the ring network responsive to the first broken ring indication signal;

forwarding the first broken ring indication signal onto the ring network via the second interface;

receiving a second broken ring indication signal for the broken link in the ring network via the second interface;

communicating the second broken ring indication signal to the first interface and the forwarding controller;

resuming forwarding of packets onto the ring network responsive to receiving both the first broken ring indication signal and the second broken ring indication signal; and replicating packets for the ring network and forwarding the packets onto the ring network via both the first interface and the second interface in response to receiving both the first broken ring indication signal and the second broken ring indication signal.

15. The method of claim 14, further comprising waiting a predefined time period after receiving the second broken ring indication signal before resuming forwarding of packets onto the ring network.

16. The method of claim 14, further comprising:

obtaining updated drop table data for a drop table;

obtaining updated forwarding table data for a forwarding table;

updating the drop table with the updated drop table data; and updating the forwarding table with the updated forwarding table data; and discontinuing replicating packets for the ring network and forwarding the packets onto the ring network via both the first interface and the second interface in response to receiving both the first broken ring indication signal and the second broken ring indication signal;

wherein packets are routed onto the ring network in accordance with the updated drop table data and updated forwarding table data.

17. The method of claim 15, further comprising:

receiving second updated drop data;

receiving second updated forwarding table data;

receiving a first healed ring indication signal via the first interface;

halting forwarding of packets onto the ring network in response to receiving the first healed ring indication signal;

updating the drop table with the second updated data once forwarding onto the ring network stops;

updating the forwarding table with the second updated forwarding data once forwarding onto the ring network stops;

forwarding the first healed ring indication signal onto the ring network via the second interface;

receiving a second healed ring indication signal via the second interface; and resuming forwarding of packets onto the ring network in response to receiving both the first broken ring indication signal and the second broken ring indication signal;

wherein upon resuming forwarding of packets, packets are forwarded in accordance with the updated drop table data and the updated forwarding table data.

18. The method of claim 14, further comprising:

receiving a first healed ring indication signal via the first interface;

halting forwarding of packets onto the ring network in response to receiving the first healed ring indication signal;

forwarding the first healed ring indication signal onto the ring network via the second interface;

receiving a second healed ring indication signal via the second interface; and resuming forwarding of packets onto the ring network in response to receiving both the first broken ring indication signal and the second broken ring indication signal.

19. The method of claim 18, further comprising waiting a predefined time period after receiving the second broken ring indication signal before resuming forwarding of packets onto the ring network.

20. An apparatus, comprising:

a first means for communicating with a first segment of a ring network;

a second means for communicating with a second segment of a ring network;

means for selectively forwarding packets to the first means for communicating, the second means for communicating, or both the first means for communicating and the second means for communicating;

the first means for communicating in response to receiving a first broken ring indication signal indicating a broken link in the ring network communicates the first broken ring indication signal to the means for selectively forwarding and the second means for communicating, and forwarding onto the ring network stops in response to the first broken ring indication signal;

wherein the second means for communicating forwards the first broken ring indication signal onto the ring network;

the second means for communicating in response to receiving a second broken ring indication signal for the broken link in the ring network via the second interface, the second means for communicating communicates the second broken ring indication signal to the first means for communicating and the means for selectively forwarding;

wherein forwarding of packets onto the ring network resumes responsive to receiving both the first broken ring indication signal and the second broken ring indication signal; and the means for selectively forwarding replicates packets for the ring network and forwards the packets onto the ring network via the first means for communicating and the second means for communicating in response to receiving both the first broken ring indication signal and the second broken ring indication signal.

* * * * *